United States Patent Office 2,846,847
Patented Aug. 12, 1958

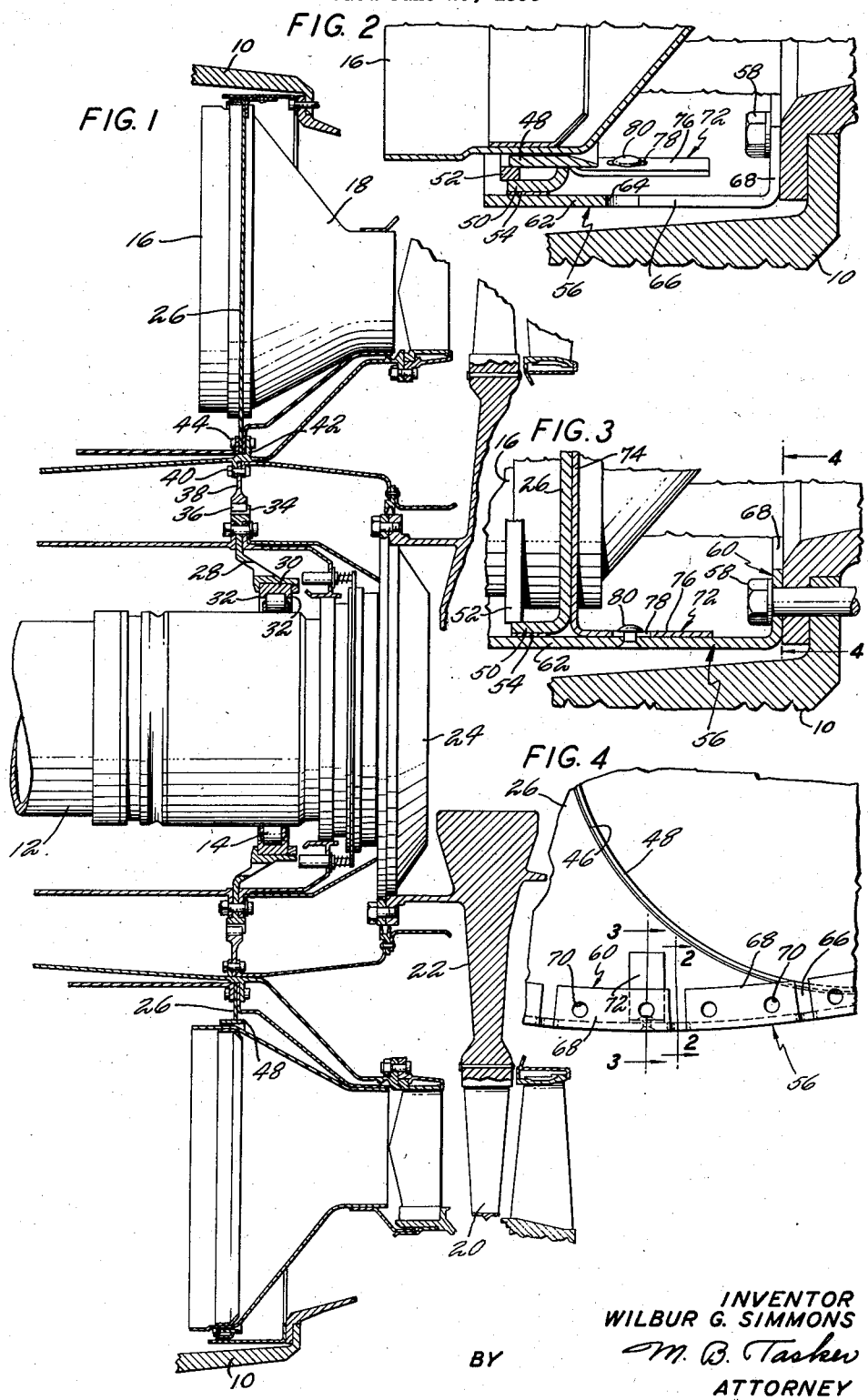

2,846,847

BEARING SUPPORT

Wilbur G. Simmons, Simsbury, Conn., assignor to United Aircraft Corporation, East Hartford, Conn., a corporation of Delaware Application June 29, 1956, Serial No. 594,723

4 Claims. (Cl. 60—39.32)

This invention relates to gas turbine engines and more particularly to improved means for supporting an intermediate engine shaft bearing.

It is an object of this invention to provide a support for a bearing intermediate the ends of the engine shaft which supports the bearing from the outer engine casing while permitting a degree of flexibility in the support.

It is another object of the invention to provide a diaphragm type support for an engine main bearing which is located in the vicinity of the combustion chambers of the engine having means permitting radial expansion and contraction of the bearing support structure.

It is a further object of the invention to provide a bearing support carried by the outer engine casing at the transition section of the engine, i. e., between the combustion chambers and the turbine, which permits opening of the casing for servicing of the burner cans.

These and other objects and advantages of the invention will become evident from the following detailed description of one embodiment of the invention shown in the accompanying drawing.

In this drawing:

Fig. 1 is a partial longitudinal sectional view through the engine in the vicinity of an intermediate main bearing;

Fig. 2 is a detail sectional view taken on line 2—2 of Fig. 4 and additionally including the outer engine casing;

Fig. 3 is a similar detail view taken on line 3—3 of Fig. 4, and

Fig. 4 is a partial end elevation of the diaphragm and and its peripheral supporting means taken on line 4—4 of Fig. 3, the attaching bolts being omitted for clarity of illustration.

As shown in Fig. 1, the burner outer housing 10 is of generally cylindrical shape. The housing supports the main axial components of the engine including the drive shaft 12 at its opposite ends in a usual manner. A number of intermediate main bearings are also provided, one of which is indicated at 14. Bearing 14 is located at the transition point in the engine where the hot gases from the combustion chambers, or burner cans, 16 are directed through ducts 18 into the turbine, the first stage of which is shown at 20. The turbine disc 22 of the first stage is secured in the usual manner to the hub 24 of the drive shaft.

In accordance with this invention, means are provided for supporting the bearing 14 from the burner outer housing 10 by means of a transverse diaphragm 26, the periphery of which is somewhat resiliently supported on the housing. To this end a bearing support ring 28 carries the outer race 30 of the bearing which has depending flanges 32 for confining the bearing rollers. Ring 28 has square splines 34 cut about its periphery which register with cooperating square splines 36 on the inner periphery of a ring member 38. Ring member 38 is secured by bolts 40 to an inner support ring 42 which in turn is connected by bolts 44 to the inner margin of the annular plate-like diaphragm 26. Diaphragm 26 has a plurality of equally spaced circular holes 46 (Fig. 4), herein 8 in number, through which the burner cans 16 project. Each hole 46 has a ring-shaped liner 48 welded therein which supports its associated burner can 16.

Diaphragm 26 also has a forwardly directed right angle flange 50 at its outer periphery which carries at its extremity eight peripherally spaced gusset members 52 secured to the flange by welding at each burner can location. These are shaped to fit around a portion of the cylindrical periphery of the burner cans and the liners 48 and are welded to both of the latter. Also, flange 50 has a wear ring 54 of stainless steel, or other wear resistant material, welded to its outer face which bears against a supporting hoop 56 secured to the outer housing 10 by an annular series of bolts 58.

Hoop 56 is angular in cross section and includes a shorter leg 60 through which the bolts 58 extend to secure the hoop to the housing and a longer leg 62 which extends forward and underlies wear ring 54. Just aft of its point of contact with ring 54 leg 62 is provided with a plurality of holes 64 which form the forward ends of a plurality of slots 66 which extend aft to the rear margin of the hoop to provide a plurality of spring fingers 68 (Fig. 4), each of which has a pair of holes 70 to receive two of the clamping bolts 58. It will be noted that slots 66 extend from holes 64 aft through hoop 56 including angle leg 60.

Additional supporting means are provided for diaphragm 26 by angle clips 72 of which there are two between each adjacent pair of burner cans. These clips, as best shown in Fig. 3, comprise a vertical leg 74 which is welded to the aft face of diaphragm 26 and a rearwardly directed leg 76 which overlies the slotted portion of hoop 56. Legs 76 are free to slide fore and aft on the hoop 56 while being held snugly thereagainst by reason of untightened rivets 80 fixed in hoop 56 and free to slide in fore and aft directed slots 78 in legs 76 of the clips, it being understood that the heads of the rivets extend beyond the sides of the slots.

From the structure above described, it will be evident that the diaphragm 26, while it supports the bearing amply from the housing, permits a certain degree of flexibility in a radial direction. It will also be evident that expansion and contraction in a radial direction is taken care of by the square splines 34 and 36 which is an important consideration, since the diaphragm is located in the vicinity of the combustion chambers and its supporting structure is, accordingly, subjected to extreme variations in temperature.

It will also be evident that the sliding support of the outer periphery of the diaphragm on the spring fingered hoop carried by the housing permits the necessary axial movement of the diaphragm relative to the housing.

It will be further evident that with the construction shown the housing can be opened to gain access to the burner cans since there is no rigid connection of the diaphragm to the housing to prevent this.

While only one embodiment of the invention has been shown for purposes of illustration, it will be evident that various changes may be made in the construction and arrangement of the parts without departing from the scope of the invention.

I claim:

1. In a gas turbine engine, an annular supporting housing, a shaft extended axially through said housing, a circular diaphragm transverse to said shaft having an axial opening through which said shaft extends, a bearing on said shaft supported by said diaphragm, said diaphragm having an annular flange at its periphery extended in an axial direction, and annular diaphragm supporting means carried by said housing having a continuous axially extended annular band frictionally engaging and radially supporting the peripheral flange on said diaphragm and also having a connected annular attaching portion provided with marginal slots therein forming a plurality of axially extended fingers, said band and flange being free for relative axial movement, and means for resiliently supporting said annular band including means for rigidly connecting the free ends of said fingers to said housing.

2. In a gas turbine engine, an outer enclosing housing, an axial drive shaft, a bearing on said shaft, means for supporting said bearing from said housing including a diaphragm, said diaphragm having a series of annularly arranged apertures therein, burner cans extending into said apertures, means between said burner cans and said bearing for permitting radial expansion of said diaphragm relative to said shaft, means carried by said housing for resiliently supporting said diaphragm at its periphery against radial movement including a hoop having axially extended fingers, and a plurality of angle clips, each having one leg thereof secured to said diaphragm and having the other leg overlying the fingers of said hoop, and fastening means carried by said fingers and extended through axial slots in said clips for permitting axial movement of said diaphragm and clips relative to said housing.

3. In a gas turbine engine, an outer enclosing housing, an axial drive shaft in said housing, a bearing on said shaft, means for supporting said bearing from said housing including a diaphragm transverse to said shaft, means carried by said housing for resiliently supporting said diaphragm at its periphery against radial movement including a diaphragm engaging hoop having axially extended finger elements, means for supporting the free ends of said finger elements on said housing, a plurality of clips having angularly related leg elements, each clip having one leg element thereof secured to said diaphragm and having its other leg element overlying one of said finger elements, and means for connecting said overlying leg and finger elements including fasteners carried by one element and extended through axial slots in the other element for permitting axial movement of said diaphragm and clips relative to said housing.

4. In a gas turbine engine, an enclosing housing, an axial drive shaft, a bearing on said shaft, means for supporting said bearing from said housing including a diaphragm transverse to said shaft, said diaphragm having a series of annularly arranged apertures therein, a burner can in each aperture having means for supporting it on said diaphragm, means carried by said housing for resiliently supporting said diaphragm at its periphery against radial movement including a diaphragm engaging hoop having axially extended fingers fixed to said housing at their extremities, and a plurality of clips having angularly related leg elements, each clip having one leg element thereof fixed to said diaphragm and its other leg element supported by said hoop.

References Cited in the file of this patent

UNITED STATES PATENTS

| | | |
|---|---|---|
| 2,524,693 | Bryant | Oct. 3, 1950 |
| 2,622,789 | Lundquist | Dec. 23, 1952 |
| 2,674,844 | Boyd et al. | Apr. 13, 1954 |
| 2,763,462 | McDowall et al. | Sept. 18, 1956 |

FOREIGN PATENTS

| | | |
|---|---|---|
| 955,995 | France | July 4, 1949 |